(12) United States Patent
Ciesla et al.

(10) Patent No.: US 8,587,548 B2
(45) Date of Patent: *Nov. 19, 2013

(54) METHOD FOR ADJUSTING THE USER INTERFACE OF A DEVICE

(75) Inventors: Craig Michael Ciesla, Mountain View, CA (US); Micah B Yairi, Daly City, CA (US); Nathaniel Mark Saal, Palo Alto, CA (US)

(73) Assignee: Tactus Technology, Inc., Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/465,737

(22) Filed: May 7, 2012

(65) Prior Publication Data

US 2012/0218213 A1 Aug. 30, 2012

Related U.S. Application Data

(63) Continuation of application No. 12/830,426, filed on Jul. 5, 2010, now Pat. No. 8,243,038.

(51) Int. Cl.
*G06F 3/041* (2006.01)
*G09G 5/00* (2006.01)

(52) U.S. Cl.
USPC ............................................ 345/173; 345/156

(58) Field of Classification Search
USPC ............ 345/156–184, 104; 178/18.01–20.04; 434/113–114; 273/457–458
See application file for complete search history.

(56) References Cited

U.S. PATENT DOCUMENTS

| | | | |
|---|---|---|---|
| 3,034,628 A | 5/1962 | Wadey | |
| 3,659,354 A | 5/1972 | Sutherland | |
| 3,759,108 A | 9/1973 | Borom et al. | |
| 3,780,236 A | 12/1973 | Gross | |
| 3,818,487 A | 6/1974 | Brody et al. | |

(Continued)

FOREIGN PATENT DOCUMENTS

| | | |
|---|---|---|
| JP | 10255106 | 9/1998 |
| JP | 2006268068 A | 10/2006 |

(Continued)

OTHER PUBLICATIONS

"Sharp Develops and Will Mass Produce New System LCD with Embedded Optical Sensors to Provide Input Capabilities Including Touch Screen and Scanner Functions," Sharp Press Release, Aug. 31, 2007, 3 pages, downloaded from the Internet at: http://sharp-world.com/corporate/news/070831.html.

(Continued)

*Primary Examiner* — Alexander Eisen
*Assistant Examiner* — Patrick F Marinelli
(74) *Attorney, Agent, or Firm* — Jeffrey Schox; Peter Miller

(57) ABSTRACT

A method adjusting a user interface experience for a device that includes providing a user interface to retrieve a user input, providing a tactile interface layer that defines a surface and includes a volume of fluid and a displacement device 10 that manipulates the volume of fluid to deform a particular region of the surface into a tactilely distinguishable formation retrieving a user preference between a first type, location, and/or timing and a second embodiment, location, and/or timing through the user interface, and manipulating the volume of fluid to deform a particular region of the surface into a tactilely distinguishable formation of one of the first and second type, location, and/or timing is disclosed.

20 Claims, 9 Drawing Sheets

(56) References Cited

U.S. PATENT DOCUMENTS

| | | |
|---|---|---|
| 4,109,118 A | 8/1978 | Kley |
| 4,209,819 A | 6/1980 | Seignemartin |
| 4,290,343 A | 9/1981 | Gram |
| 4,307,268 A | 12/1981 | Harper |
| 4,467,321 A | 8/1984 | Volnak |
| 4,477,700 A | 10/1984 | Balash et al. |
| 4,517,421 A | 5/1985 | Margolin |
| 4,543,000 A | 9/1985 | Hasenbalg |
| 4,700,025 A | 10/1987 | Hatayama et al. |
| 4,920,343 A | 4/1990 | Schwartz |
| 5,194,852 A | 3/1993 | More et al. |
| 5,195,659 A | 3/1993 | Eiskant |
| 5,212,473 A | 5/1993 | Louis |
| 5,222,895 A | 6/1993 | Fricke |
| 5,286,199 A | 2/1994 | Kipke |
| 5,369,228 A | 11/1994 | Faust |
| 5,412,189 A | 5/1995 | Cragun |
| 5,459,461 A | 10/1995 | Crowley et al. |
| 5,488,204 A | 1/1996 | Mead et al. |
| 5,496,174 A * | 3/1996 | Garner .................. 434/114 |
| 5,666,112 A | 9/1997 | Crowley et al. |
| 5,717,423 A | 2/1998 | Parker |
| 5,729,222 A | 3/1998 | Iggulden et al. |
| 5,742,241 A | 4/1998 | Crowley et al. |
| 5,754,023 A | 5/1998 | Roston et al. |
| 5,766,013 A | 6/1998 | Vuyk |
| 5,767,839 A | 6/1998 | Rosenberg |
| 5,835,080 A | 11/1998 | Beeteson et al. |
| 5,880,411 A | 3/1999 | Gillespie et al. |
| 5,889,236 A | 3/1999 | Gillespie et al. |
| 5,917,906 A | 6/1999 | Thornton |
| 5,943,043 A | 8/1999 | Furuhata et al. |
| 5,977,867 A | 11/1999 | Blouin |
| 5,982,304 A | 11/1999 | Selker et al. |
| 6,067,116 A | 5/2000 | Yamano et al. |
| 6,154,198 A | 11/2000 | Rosenberg |
| 6,154,201 A | 11/2000 | Levin et al. |
| 6,160,540 A | 12/2000 | Fishkin et al. |
| 6,169,540 B1 | 1/2001 | Rosenberg et al. |
| 6,188,391 B1 | 2/2001 | Seely et al. |
| 6,218,966 B1 | 4/2001 | Goodwin et al. |
| 6,243,074 B1 | 6/2001 | Fishkin et al. |
| 6,243,078 B1 | 6/2001 | Rosenberg |
| 6,268,857 B1 | 7/2001 | Fishkin et al. |
| 6,271,828 B1 | 8/2001 | Rosenberg et al. |
| 6,300,937 B1 | 10/2001 | Rosenberg |
| 6,310,614 B1 | 10/2001 | Maeda et al. |
| 6,323,846 B1 | 11/2001 | Westerman et al. |
| 6,337,678 B1 | 1/2002 | Fish |
| 6,354,839 B1 | 3/2002 | Schmidt et al. |
| 6,356,259 B1 | 3/2002 | Maeda et al. |
| 6,366,272 B1 | 4/2002 | Rosenberg et al. |
| 6,369,803 B2 | 4/2002 | Brisebois et al. |
| 6,384,743 B1 | 5/2002 | Vanderheiden |
| 6,414,671 B1 | 7/2002 | Gillespie et al. |
| 6,429,846 B2 | 8/2002 | Rosenberg et al. |
| 6,437,771 B1 | 8/2002 | Rosenberg et al. |
| 6,462,294 B2 | 10/2002 | Davidson et al. |
| 6,469,692 B2 | 10/2002 | Rosenberg |
| 6,486,872 B2 | 11/2002 | Rosenberg et al. |
| 6,498,353 B2 | 12/2002 | Nagle et al. |
| 6,501,462 B1 | 12/2002 | Garner |
| 6,509,892 B1 | 1/2003 | Cooper et al. |
| 6,573,844 B1 | 6/2003 | Venolia et al. |
| 6,636,202 B2 | 10/2003 | Ishmael, Jr. et al. |
| 6,639,581 B1 | 10/2003 | Moore et al. |
| 6,655,788 B1 | 12/2003 | Freeman |
| 6,657,614 B1 | 12/2003 | Ito et al. |
| 6,667,738 B2 | 12/2003 | Murphy |
| 6,681,031 B2 | 1/2004 | Cohen et al. |
| 6,686,911 B1 | 2/2004 | Levin et al. |
| 6,697,086 B2 | 2/2004 | Rosenberg et al. |
| 6,700,556 B2 | 3/2004 | Richley et al. |
| 6,703,924 B2 | 3/2004 | Tecu et al. |
| 6,743,021 B2 | 6/2004 | Prince et al. |
| 6,788,295 B1 | 9/2004 | Inkster |
| 6,819,316 B2 | 11/2004 | Schulz et al. |
| 6,850,222 B1 | 2/2005 | Rosenberg |
| 6,861,961 B2 | 3/2005 | Sandbach et al. |
| 6,877,986 B2 | 4/2005 | Fournier et al. |
| 6,881,063 B2 | 4/2005 | Yang |
| 6,930,234 B2 | 8/2005 | Davis |
| 6,937,225 B1 | 8/2005 | Kehlstadt et al. |
| 6,975,305 B2 | 12/2005 | Yamashita |
| 6,979,164 B2 | 12/2005 | Kramer |
| 6,982,696 B1 | 1/2006 | Shahoian |
| 6,995,745 B2 | 2/2006 | Boon et al. |
| 7,027,032 B2 | 4/2006 | Rosenberg et al. |
| 7,056,051 B2 | 6/2006 | Fiffie |
| 7,061,467 B2 | 6/2006 | Rosenberg |
| 7,064,655 B2 | 6/2006 | Murray et al. |
| 7,081,888 B2 | 7/2006 | Cok et al. |
| 7,096,852 B2 | 8/2006 | Gregorio |
| 7,102,541 B2 | 9/2006 | Rosenberg |
| 7,104,152 B2 | 9/2006 | Levin et al. |
| 7,106,305 B2 | 9/2006 | Rosenberg |
| 7,106,313 B2 | 9/2006 | Schena et al. |
| 7,109,967 B2 | 9/2006 | Hioki et al. |
| 7,112,737 B2 | 9/2006 | Ramstein |
| 7,113,166 B1 | 9/2006 | Rosenberg et al. |
| 7,116,317 B2 | 10/2006 | Gregorio et al. |
| 7,124,425 B1 | 10/2006 | Anderson, Jr. et al. |
| 7,129,854 B2 | 10/2006 | Arneson et al. |
| 7,131,073 B2 | 10/2006 | Rosenberg et al. |
| 7,136,045 B2 | 11/2006 | Rosenberg et al. |
| 7,138,977 B2 | 11/2006 | Kinerk et al. |
| 7,138,985 B2 | 11/2006 | Nakajima |
| 7,143,785 B2 | 12/2006 | Maerkl et al. |
| 7,144,616 B1 | 12/2006 | Unger et al. |
| 7,148,875 B2 | 12/2006 | Rosenberg et al. |
| 7,151,432 B2 | 12/2006 | Tierling |
| 7,151,527 B2 | 12/2006 | Culver |
| 7,151,528 B2 | 12/2006 | Taylor et al. |
| 7,154,470 B2 | 12/2006 | Tierling |
| 7,158,112 B2 | 1/2007 | Rosenberg et al. |
| 7,159,008 B1 | 1/2007 | Wies et al. |
| 7,161,276 B2 | 1/2007 | Face |
| 7,161,580 B2 | 1/2007 | Bailey et al. |
| 7,168,042 B2 | 1/2007 | Braun et al. |
| 7,176,903 B2 | 2/2007 | Katsuki et al. |
| 7,182,691 B1 | 2/2007 | Schena |
| 7,191,191 B2 | 3/2007 | Peurach et al. |
| 7,193,607 B2 | 3/2007 | Moore et al. |
| 7,195,170 B2 | 3/2007 | Matsumoto et al. |
| 7,196,688 B2 | 3/2007 | Schena |
| 7,198,137 B2 | 4/2007 | Olien |
| 7,199,790 B2 | 4/2007 | Rosenberg et al. |
| 7,202,851 B2 | 4/2007 | Cunningham et al. |
| 7,205,981 B2 | 4/2007 | Cunningham |
| 7,208,671 B2 | 4/2007 | Chu |
| 7,209,028 B2 | 4/2007 | Boronkay et al. |
| 7,209,117 B2 | 4/2007 | Rosenberg et al. |
| 7,209,118 B2 | 4/2007 | Shahoian et al. |
| 7,210,160 B2 | 4/2007 | Anderson, Jr. et al. |
| 7,215,326 B2 | 5/2007 | Rosenberg |
| 7,216,671 B2 | 5/2007 | Unger et al. |
| 7,218,310 B2 | 5/2007 | Tierling et al. |
| 7,218,313 B2 | 5/2007 | Marcus et al. |
| 7,233,313 B2 | 6/2007 | Levin et al. |
| 7,233,315 B2 | 6/2007 | Gregorio et al. |
| 7,233,476 B2 | 6/2007 | Goldenberg et al. |
| 7,236,157 B2 | 6/2007 | Schena et al. |
| 7,245,202 B2 | 7/2007 | Levin |
| 7,245,292 B1 | 7/2007 | Custy |
| 7,249,951 B2 | 7/2007 | Bevirt et al. |
| 7,250,128 B2 | 7/2007 | Unger et al. |
| 7,253,803 B2 | 8/2007 | Schena et al. |
| 7,253,807 B2 | 8/2007 | Nakajima |
| 7,265,750 B2 | 9/2007 | Rosenberg |
| 7,280,095 B2 | 10/2007 | Grant |
| 7,283,120 B2 | 10/2007 | Grant |
| 7,283,123 B2 | 10/2007 | Braun et al. |
| 7,289,106 B2 | 10/2007 | Bailey et al. |
| 7,289,111 B2 | 10/2007 | Asbill |

(56) References Cited

U.S. PATENT DOCUMENTS

| | | |
|---|---|---|
| 7,307,619 B2 | 12/2007 | Cunningham et al. |
| 7,308,831 B2 | 12/2007 | Cunningham et al. |
| 7,319,374 B2 | 1/2008 | Shahoian |
| 7,336,260 B2 | 2/2008 | Martin et al. |
| 7,336,266 B2 | 2/2008 | Hayward et al. |
| 7,339,572 B2 | 3/2008 | Schena |
| 7,339,580 B2 | 3/2008 | Westerman et al. |
| 7,342,573 B2 | 3/2008 | Ryynaenen |
| 7,355,595 B2 | 4/2008 | Bathiche et al. |
| 7,369,115 B2 | 5/2008 | Cruz-Hernandez et al. |
| 7,382,357 B2 | 6/2008 | Panotopoulos et al. |
| 7,390,157 B2 | 6/2008 | Kramer |
| 7,391,861 B2 | 6/2008 | Levy |
| 7,397,466 B2 | 7/2008 | Bourdelais et al. |
| 7,403,191 B2 | 7/2008 | Sinclair |
| 7,432,910 B2 | 10/2008 | Shahoian |
| 7,432,911 B2 | 10/2008 | Skarine |
| 7,432,912 B2 | 10/2008 | Cote et al. |
| 7,433,719 B2 | 10/2008 | Dabov |
| 7,471,280 B2 | 12/2008 | Prins |
| 7,489,309 B2 | 2/2009 | Levin et al. |
| 7,511,702 B2 | 3/2009 | Hotelling |
| 7,522,152 B2 | 4/2009 | Olien et al. |
| 7,545,289 B2 | 6/2009 | Mackey et al. |
| 7,548,232 B2 | 6/2009 | Shahoian et al. |
| 7,551,161 B2 | 6/2009 | Mann |
| 7,561,142 B2 | 7/2009 | Shahoian et al. |
| 7,567,232 B2 | 7/2009 | Rosenberg |
| 7,567,243 B2 | 7/2009 | Hayward |
| 7,589,714 B2 | 9/2009 | Funaki |
| 7,592,999 B2 | 9/2009 | Rosenberg et al. |
| 7,605,800 B2 | 10/2009 | Rosenberg |
| 7,609,178 B2 | 10/2009 | Son et al. |
| 7,659,885 B2 | 2/2010 | Kraus et al. |
| 7,671,837 B2 | 3/2010 | Forsblad et al. |
| 7,679,611 B2 | 3/2010 | Schena |
| 7,679,839 B2 | 3/2010 | Polyakov et al. |
| 7,688,310 B2 | 3/2010 | Rosenberg |
| 7,701,438 B2 | 4/2010 | Chang et al. |
| 7,728,820 B2 | 6/2010 | Rosenberg et al. |
| 7,733,575 B2 | 6/2010 | Heim et al. |
| 7,743,348 B2 | 6/2010 | Robbins et al. |
| 7,755,602 B2 | 7/2010 | Tremblay et al. |
| 7,808,488 B2 | 10/2010 | Martin et al. |
| 7,834,853 B2 | 11/2010 | Finney et al. |
| 7,843,424 B2 | 11/2010 | Rosenberg et al. |
| 7,864,164 B2 | 1/2011 | Cunningham et al. |
| 7,869,589 B2 | 1/2011 | Tuovinen |
| 7,890,257 B2 | 2/2011 | Fyke et al. |
| 7,890,863 B2 | 2/2011 | Grant et al. |
| 7,920,131 B2 | 4/2011 | Westerman |
| 7,924,145 B2 | 4/2011 | Yuk et al. |
| 7,944,435 B2 | 5/2011 | Rosenberg et al. |
| 7,952,498 B2 | 5/2011 | Higa |
| 7,956,770 B2 | 6/2011 | Klinghult et al. |
| 7,973,773 B2 | 7/2011 | Pryor |
| 7,978,181 B2 | 7/2011 | Westerman |
| 7,978,183 B2 | 7/2011 | Rosenberg et al. |
| 7,978,186 B2 | 7/2011 | Vassallo et al. |
| 7,979,797 B2 | 7/2011 | Schena |
| 7,982,720 B2 | 7/2011 | Rosenberg et al. |
| 7,986,303 B2 | 7/2011 | Braun et al. |
| 7,986,306 B2 | 7/2011 | Eich et al. |
| 7,989,181 B2 | 8/2011 | Blattner et al. |
| 7,999,660 B2 | 8/2011 | Cybart et al. |
| 8,002,089 B2 | 8/2011 | Jasso et al. |
| 8,004,492 B2 | 8/2011 | Kramer et al. |
| 8,013,843 B2 | 9/2011 | Pryor |
| 8,020,095 B2 | 9/2011 | Braun et al. |
| 8,022,933 B2 | 9/2011 | Hardacker et al. |
| 8,031,181 B2 | 10/2011 | Rosenberg et al. |
| 8,044,826 B2 | 10/2011 | Yoo |
| 8,047,849 B2 | 11/2011 | Ahn et al. |
| 8,049,734 B2 | 11/2011 | Rosenberg et al. |
| 8,059,104 B2 | 11/2011 | Shahoian et al. |
| 8,059,105 B2 | 11/2011 | Rosenberg et al. |
| 8,063,892 B2 | 11/2011 | Shahoian et al. |
| 8,063,893 B2 | 11/2011 | Rosenberg et al. |
| 8,068,605 B2 | 11/2011 | Holmberg |
| 8,077,154 B2 | 12/2011 | Emig et al. |
| 8,077,440 B2 | 12/2011 | Krabbenborg et al. |
| 8,077,941 B2 | 12/2011 | Assmann |
| 8,094,121 B2 | 1/2012 | Obermeyer et al. |
| 8,094,806 B2 | 1/2012 | Levy |
| 8,103,472 B2 | 1/2012 | Braun et al. |
| 8,106,787 B2 | 1/2012 | Nurmi |
| 8,115,745 B2 | 2/2012 | Gray |
| 8,123,660 B2 | 2/2012 | Kruse et al. |
| 8,125,347 B2 | 2/2012 | Fahn |
| 8,125,461 B2 | 2/2012 | Weber et al. |
| 8,130,202 B2 | 3/2012 | Levine et al. |
| 8,144,129 B2 | 3/2012 | Hotelling et al. |
| 8,144,271 B2 | 3/2012 | Han |
| 8,154,512 B2 | 4/2012 | Olien et al. |
| 8,154,527 B2 | 4/2012 | Ciesla et al. |
| 8,159,461 B2 | 4/2012 | Martin et al. |
| 8,162,009 B2 | 4/2012 | Chaffee |
| 8,164,573 B2 | 4/2012 | Dacosta et al. |
| 8,169,306 B2 | 5/2012 | Schmidt et al. |
| 8,169,402 B2 | 5/2012 | Shahoian et al. |
| 8,174,372 B2 | 5/2012 | Da Costa |
| 8,174,495 B2 | 5/2012 | Takashima et al. |
| 8,174,508 B2 | 5/2012 | Sinclair et al. |
| 8,174,511 B2 | 5/2012 | Takenaka et al. |
| 8,178,808 B2 | 5/2012 | Strittmatter |
| 8,179,375 B2 | 5/2012 | Ciesla et al. |
| 8,179,377 B2 | 5/2012 | Ciesla et al. |
| 8,188,989 B2 | 5/2012 | Levin et al. |
| 8,195,243 B2 | 6/2012 | Kim et al. |
| 8,199,107 B2 | 6/2012 | Xu et al. |
| 8,199,124 B2 | 6/2012 | Ciesla et al. |
| 8,203,094 B2 | 6/2012 | Mittleman et al. |
| 8,207,950 B2 | 6/2012 | Ciesla et al. |
| 8,212,772 B2 | 7/2012 | Shahoian |
| 8,217,903 B2 | 7/2012 | Ma et al. |
| 8,217,904 B2 | 7/2012 | Kim |
| 8,224,392 B2 | 7/2012 | Kim et al. |
| 8,228,305 B2 | 7/2012 | Pryor |
| 8,232,976 B2 | 7/2012 | Yun et al. |
| 8,243,038 B2 * | 8/2012 | Ciesla et al. ............... 345/173 |
| 8,253,052 B2 | 8/2012 | Chen |
| 8,253,703 B2 | 8/2012 | Eldering |
| 8,279,172 B2 | 10/2012 | Braun et al. |
| 8,279,193 B1 | 10/2012 | Birnbaum et al. |
| 8,310,458 B2 | 11/2012 | Faubert et al. |
| 8,345,013 B2 | 1/2013 | Heubel et al. |
| 8,350,820 B2 | 1/2013 | Deslippe et al. |
| 8,362,882 B2 | 1/2013 | Heubel et al. |
| 8,363,008 B2 | 1/2013 | Ryu et al. |
| 8,367,957 B2 | 2/2013 | Strittmatter |
| 8,368,641 B2 | 2/2013 | Tremblay et al. |
| 8,378,797 B2 | 2/2013 | Pance et al. |
| 8,384,680 B2 | 2/2013 | Paleczny et al. |
| 8,390,594 B2 | 3/2013 | Modarres et al. |
| 8,395,587 B2 | 3/2013 | Cauwels et al. |
| 8,395,591 B2 | 3/2013 | Kruglick |
| 8,400,402 B2 | 3/2013 | Son |
| 8,400,410 B2 | 3/2013 | Taylor et al. |
| 2001/0008396 A1 | 7/2001 | Komata |
| 2001/0043189 A1 | 11/2001 | Brisebois et al. |
| 2002/0106614 A1 | 8/2002 | Prince et al. |
| 2002/0110237 A1 | 8/2002 | Krishnan |
| 2003/0087698 A1 | 5/2003 | Nishiumi et al. |
| 2003/0179190 A1 | 9/2003 | Franzen |
| 2003/0206153 A1 | 11/2003 | Murphy |
| 2004/0056876 A1 | 3/2004 | Nakajima |
| 2004/0056877 A1 | 3/2004 | Nakajima |
| 2004/0164968 A1 | 8/2004 | Miyamoto |
| 2004/0178006 A1 | 9/2004 | Cok |
| 2005/0007339 A1 | 1/2005 | Sato |
| 2005/0007349 A1 | 1/2005 | Vakil et al. |
| 2005/0020325 A1 | 1/2005 | Enger et al. |
| 2005/0030292 A1 | 2/2005 | Diederiks |
| 2005/0057528 A1 | 3/2005 | Kleen |

(56) References Cited

U.S. PATENT DOCUMENTS

| | | |
|---|---|---|
| 2005/0088417 A1 | 4/2005 | Mulligan |
| 2005/0110768 A1 | 5/2005 | Marriott et al. |
| 2005/0162408 A1 | 7/2005 | Martchovsky |
| 2005/0231489 A1 | 10/2005 | Ladouceur et al. |
| 2005/0253816 A1 | 11/2005 | Himberg et al. |
| 2005/0285846 A1 | 12/2005 | Funaki |
| 2006/0026521 A1 | 2/2006 | Hotelling et al. |
| 2006/0097991 A1 | 5/2006 | Hotelling et al. |
| 2006/0098148 A1 | 5/2006 | Kobayashi et al. |
| 2006/0118610 A1 | 6/2006 | Pihlaja et al. |
| 2006/0119586 A1 | 6/2006 | Grant et al. |
| 2006/0197753 A1 | 9/2006 | Hotelling |
| 2006/0214923 A1 | 9/2006 | Chiu et al. |
| 2006/0238495 A1 | 10/2006 | Davis |
| 2006/0238510 A1 | 10/2006 | Panotopoulos et al. |
| 2006/0256075 A1 | 11/2006 | Anastas et al. |
| 2006/0278444 A1 | 12/2006 | Binstead |
| 2007/0013662 A1 | 1/2007 | Fauth |
| 2007/0036492 A1 | 2/2007 | Lee |
| 2007/0085837 A1 | 4/2007 | Ricks et al. |
| 2007/0108032 A1 | 5/2007 | Matsumoto et al. |
| 2007/0122314 A1 | 5/2007 | Strand et al. |
| 2007/0152983 A1 | 7/2007 | Mckillop et al. |
| 2007/0165004 A1 | 7/2007 | Seelhammer et al. |
| 2007/0171210 A1 | 7/2007 | Chaudhri et al. |
| 2007/0182718 A1 | 8/2007 | Schoener et al. |
| 2007/0229233 A1 | 10/2007 | Dort |
| 2007/0236466 A1 | 10/2007 | Hotelling |
| 2007/0236469 A1 | 10/2007 | Woolley et al. |
| 2007/0247429 A1 | 10/2007 | Westerman |
| 2007/0254411 A1 | 11/2007 | Uhland et al. |
| 2007/0257634 A1 | 11/2007 | Leschin et al. |
| 2007/0273561 A1 | 11/2007 | Philipp |
| 2007/0296702 A1 | 12/2007 | Strawn et al. |
| 2007/0296709 A1 | 12/2007 | Guanghai |
| 2008/0010593 A1 | 1/2008 | Uusitalo et al. |
| 2008/0024459 A1 | 1/2008 | Poupyrev et al. |
| 2008/0136791 A1 | 6/2008 | Nissar |
| 2008/0138774 A1 | 6/2008 | Ahn et al. |
| 2008/0143693 A1 | 6/2008 | Schena |
| 2008/0150911 A1 | 6/2008 | Harrison |
| 2008/0165139 A1 | 7/2008 | Hotelling et al. |
| 2008/0174570 A1 | 7/2008 | Jobs et al. |
| 2008/0202251 A1 | 8/2008 | Serban et al. |
| 2008/0238448 A1 | 10/2008 | Moore et al. |
| 2008/0248836 A1 | 10/2008 | Caine |
| 2008/0251368 A1 | 10/2008 | Holmberg et al. |
| 2008/0252607 A1 | 10/2008 | De Jong et al. |
| 2008/0266264 A1 | 10/2008 | Lipponen et al. |
| 2008/0286447 A1 | 11/2008 | Alden et al. |
| 2008/0291169 A1 | 11/2008 | Brenner et al. |
| 2008/0297475 A1 | 12/2008 | Woolf et al. |
| 2008/0303796 A1 | 12/2008 | Fyke |
| 2009/0002140 A1 | 1/2009 | Higa |
| 2009/0002205 A1 | 1/2009 | Klinghult et al. |
| 2009/0002328 A1 | 1/2009 | Ullrich et al. |
| 2009/0002337 A1 | 1/2009 | Chang |
| 2009/0009480 A1 | 1/2009 | Heringslack |
| 2009/0015547 A1 | 1/2009 | Franz et al. |
| 2009/0033617 A1 | 2/2009 | Lindberg et al. |
| 2009/0066672 A1 | 3/2009 | Tanabe et al. |
| 2009/0085878 A1 | 4/2009 | Heubel et al. |
| 2009/0106655 A1 | 4/2009 | Grant et al. |
| 2009/0115733 A1 | 5/2009 | Ma et al. |
| 2009/0115734 A1 | 5/2009 | Fredriksson et al. |
| 2009/0128503 A1 | 5/2009 | Grant et al. |
| 2009/0135145 A1 | 5/2009 | Chen et al. |
| 2009/0140989 A1 | 6/2009 | Ahlgren |
| 2009/0160813 A1 | 6/2009 | Takashima et al. |
| 2009/0167508 A1 | 7/2009 | Fadell et al. |
| 2009/0167509 A1 | 7/2009 | Fadell et al. |
| 2009/0167677 A1 | 7/2009 | Kruse et al. |
| 2009/0167704 A1 | 7/2009 | Terlizzi et al. |
| 2009/0174673 A1 | 7/2009 | Ciesla |
| 2009/0174687 A1 | 7/2009 | Ciesla et al. |
| 2009/0181724 A1 | 7/2009 | Pettersson |
| 2009/0182501 A1 | 7/2009 | Fyke et al. |
| 2009/0195512 A1 | 8/2009 | Pettersson |
| 2009/0243998 A1 | 10/2009 | Wang |
| 2009/0250267 A1 | 10/2009 | Heubel et al. |
| 2009/0303022 A1 | 12/2009 | Griffin et al. |
| 2010/0043189 A1 | 2/2010 | Fukano |
| 2010/0097323 A1 | 4/2010 | Edwards et al. |
| 2010/0103116 A1 | 4/2010 | Leung et al. |
| 2010/0103137 A1 | 4/2010 | Ciesla et al. |
| 2010/0109486 A1 | 5/2010 | Polyakov et al. |
| 2010/0162109 A1 | 6/2010 | Chatterjee et al. |
| 2010/0171719 A1 | 7/2010 | Craig et al. |
| 2010/0171720 A1 | 7/2010 | Craig et al. |
| 2010/0177050 A1 | 7/2010 | Heubel et al. |
| 2010/0182245 A1 | 7/2010 | Edwards et al. |
| 2010/0295820 A1 | 11/2010 | Kikin-Gil |
| 2010/0321335 A1 | 12/2010 | Lim et al. |
| 2011/0001613 A1 | 1/2011 | Ciesla et al. |
| 2011/0012851 A1 | 1/2011 | Ciesla et al. |
| 2011/0018813 A1 | 1/2011 | Kruglick |
| 2011/0029862 A1 | 2/2011 | Scott et al. |
| 2011/0148793 A1 | 6/2011 | Ciesla et al. |
| 2011/0148807 A1 | 6/2011 | Fryer |
| 2011/0157080 A1 | 6/2011 | Ciesla et al. |
| 2011/0175838 A1 | 7/2011 | Higa |
| 2011/0254672 A1 | 10/2011 | Ciesla et al. |
| 2011/0254709 A1 | 10/2011 | Ciesla et al. |
| 2011/0254789 A1 | 10/2011 | Ciesla et al. |
| 2012/0032886 A1 | 2/2012 | Ciesla et al. |
| 2012/0043191 A1 | 2/2012 | Kessler et al. |
| 2012/0056846 A1 | 3/2012 | Zaliva |
| 2012/0062483 A1 | 3/2012 | Ciesla et al. |
| 2012/0098789 A1 | 4/2012 | Ciesla et al. |
| 2012/0105333 A1 | 5/2012 | Maschmeyer et al. |
| 2012/0193211 A1 | 8/2012 | Ciesla et al. |
| 2012/0200528 A1 | 8/2012 | Ciesla et al. |
| 2012/0200529 A1 | 8/2012 | Ciesla et al. |
| 2012/0206364 A1 | 8/2012 | Ciesla et al. |
| 2012/0218214 A1 | 8/2012 | Ciesla et al. |
| 2012/0235935 A1 | 9/2012 | Ciesla et al. |
| 2012/0242607 A1 | 9/2012 | Ciesla et al. |
| 2012/0306787 A1 | 12/2012 | Ciesla et al. |
| 2013/0019207 A1 | 1/2013 | Rothkopf et al. |

FOREIGN PATENT DOCUMENTS

| | | |
|---|---|---|
| JP | 2006285785 A | 10/2006 |
| WO | 2004028955 A | 4/2004 |
| WO | 2008037275 A | 4/2008 |
| WO | 2009088985 A | 7/2009 |
| WO | 2010077382 A | 7/2010 |
| WO | 2010078596 A | 7/2010 |
| WO | 2010078597 A | 7/2010 |
| WO | 2011003113 A | 1/2011 |
| WO | 2011087816 A | 7/2011 |
| WO | 2011087817 A | 7/2011 |
| WO | 2011112984 A | 9/2011 |
| WO | 2011133604 A | 10/2011 |
| WO | 2011133605 A | 10/2011 |

OTHER PUBLICATIONS

Jeong et al., "Tunable Microdoublet Lens Array," Optical Society of America, Optics Express; vol. 12, No. 11. May 31, 2004, 7 Pages.

* cited by examiner

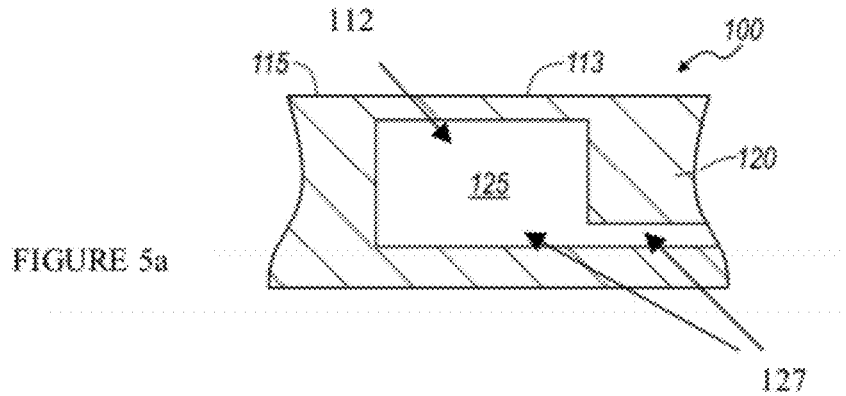
FIGURE 5a
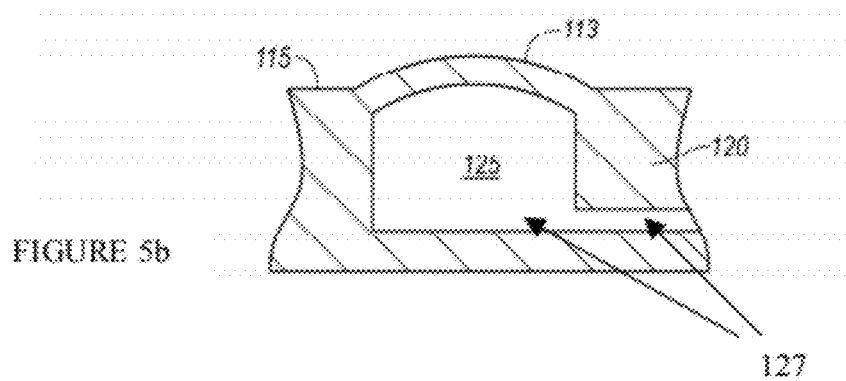
FIGURE 5b
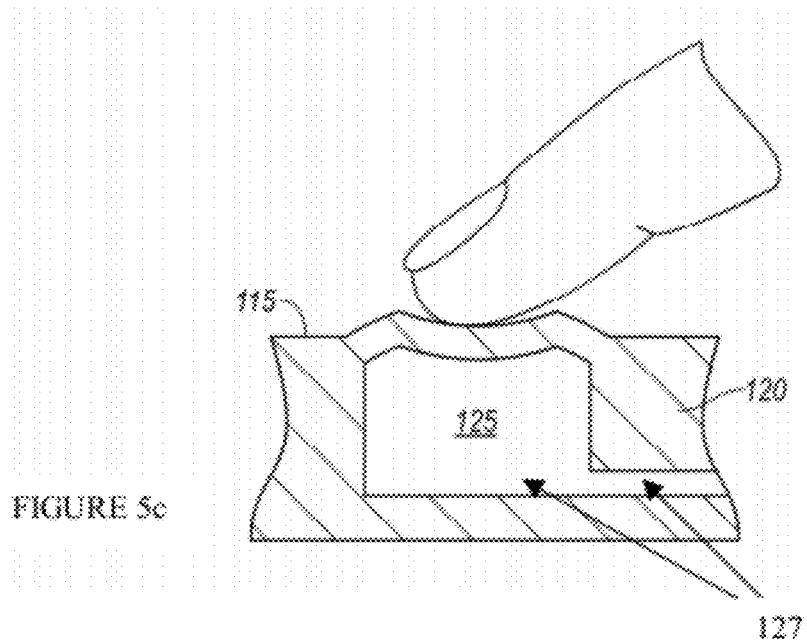
FIGURE 5c
FIGURE 5

METHOD FOR ADJUSTING THE USER INTERFACE OF A DEVICE

CROSS-REFERENCE TO RELATED APPLICATIONS

This application is a continuation of prior U.S. application Ser. No. 12/830,426, filed on 5 Jul. 2010, which is incorporated in its entirety by this reference.

This application is related to U.S. application Ser. No. 11/969,848, filed on 4 Jan. 2008, and U.S. application Ser. No. 12/319,334, filed on 5 Jan. 2009, which are both incorporated in their entirety by this reference.

TECHNICAL FIELD

This invention relates generally to touch sensitive user interfaces, and more specifically to a new and useful mountable systems and methods for selectively raising portions of touch sensitive displays.

BACKGROUND

The user interface system of U.S. application Ser. Nos. 11/969,848 and 12/319,334 is preferably used as the user interface for an electronic device, more specifically, in an electronic device that benefits from an adaptive user interface. The user interface system functions to provide a tactile guide and/or feedback to the user. Because of the variety of devices and uses that the user interface system may be used for, for example, an automotive console, a tablet computer, a smartphone, a personal navigation device, a personal media player, a watch, a remote control, a trackpad, or a keyboard, the user interface system must accommodate to each application to provide the user with the kind of tactile guide and/or feedback that facilitates the user in the operation of the device 10. In addition, each user may have a different preference for the kind of tactile guide and/or feedback that is most useful to them in facilitating the operation of the device. For example, while some users may prefer a larger surface area of tactile guidance, others may prefer a larger degree of deformation of the surface area of tactile guidance. Because of the large range of usage scenarios, determining an average user interface system setting that may accommodate to a relatively large range of user preferences for each usage scenario requires a substantial amount of time and research. In addition, because of the large range of user preferences, configuring one set of settings for each use scenario may not provide a user with their preferred tactile guidance and/or feedback. This invention allows the user to adjust the characteristics of the user interface system in order to allow the user interface system to efficiently accommodate to both the usage scenario and the user in a large range of devices and usage scenarios.

BRIEF DESCRIPTION OF THE FIGURES

FIGS. 5*a*, 5*b*, and 5*c* are cross-sectional views illustrating the operation of a particular region of the surface of the tactile interface layer in accordance to the preferred embodiments.

DESCRIPTION OF THE PREFERRED EMBODIMENTS

The following description of the preferred embodiments of the invention is not intended to limit the invention to these preferred embodiments, but rather to enable any person skilled in the art to make and use this invention.

Figure 1:
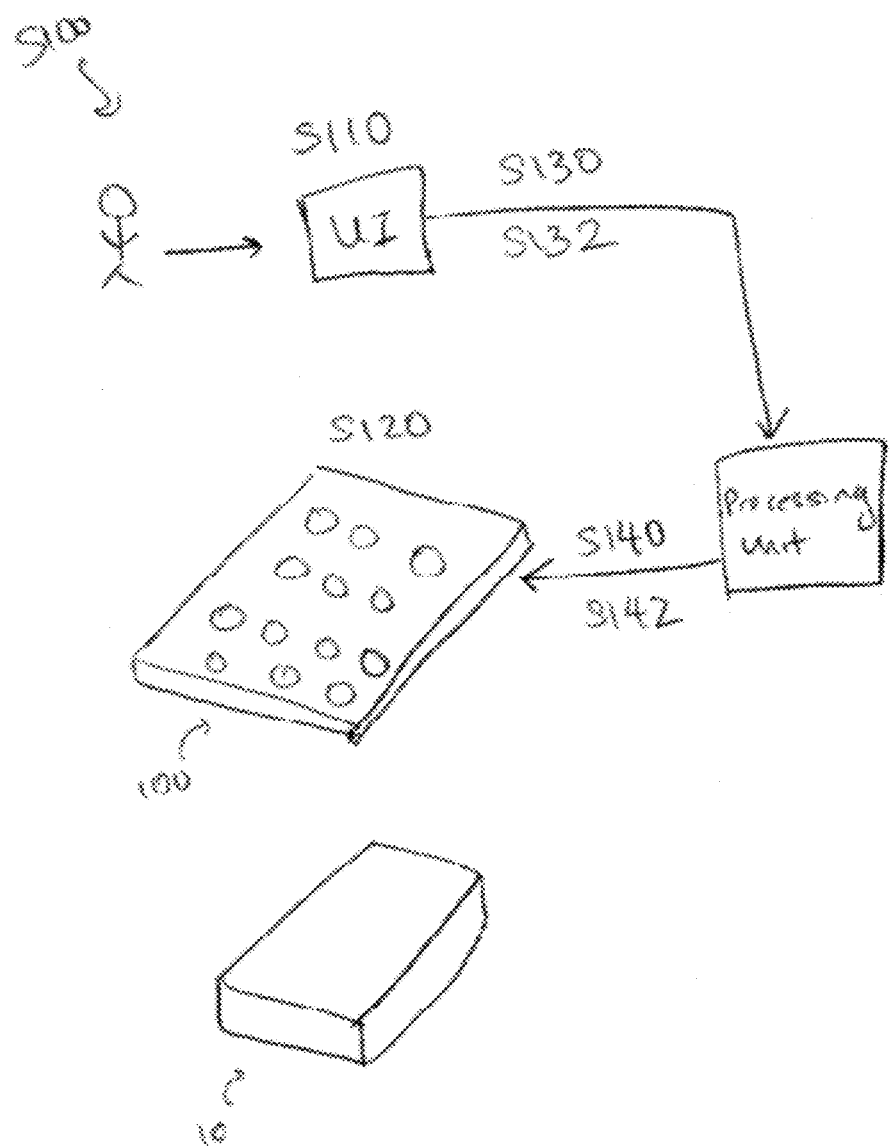
FIGS. 1 and 2 are a first and second variation of the method of the preferred embodiments, respectively.
Figure 2:
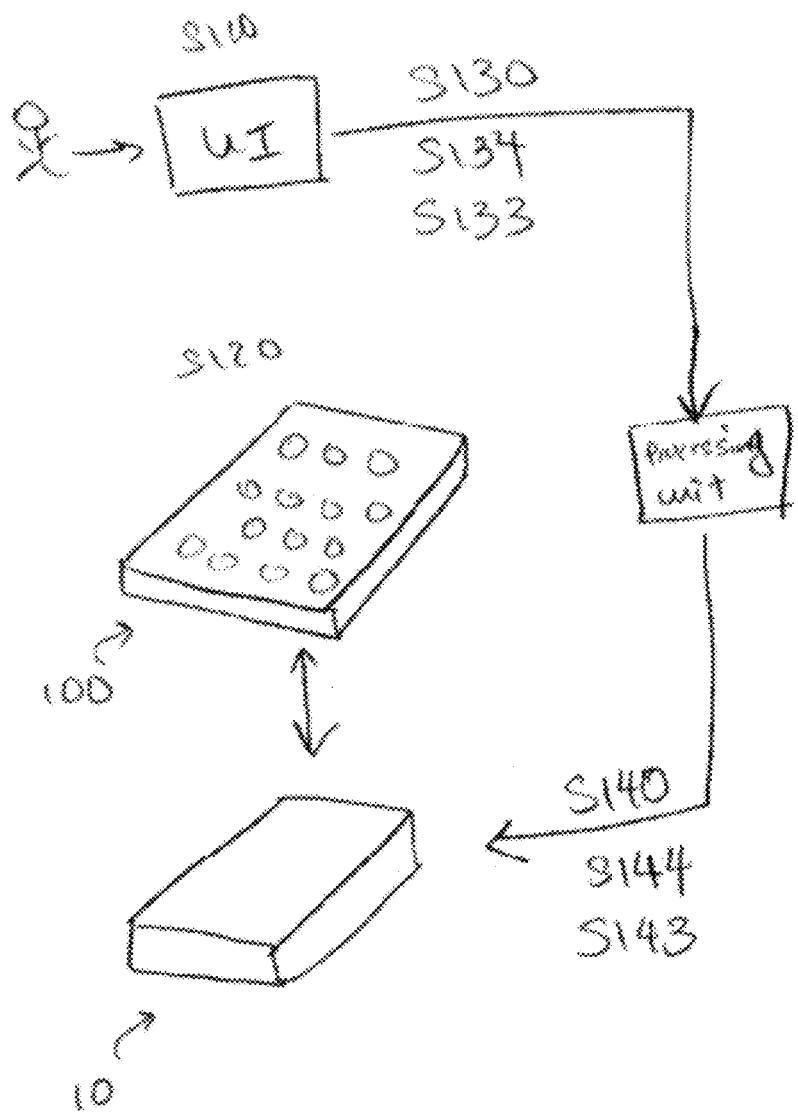

As shown in FIGS. 1 and 2, the method S100 of the preferred embodiments for adjusting a user interface for a device preferably includes providing a user interface to retrieve a user input Step S110, providing a tactile interface layer that defines a surface and includes a volume of fluid and a displacement device that manipulates the volume of fluid to deform a particular region of the surface into a tactilely distinguishable formation Step S120, retrieving a user preference between a first choice of type, location, and/or timing and a second choice of kind, location, and/or timing through the user interface Step S130, and manipulating the volume of fluid to deform a particular region of the surface into a tactilely distinguishable formation of the chosen type, location, and/or timing Step S140. The tactile interface layer may also include a sensor that detects a user input at the tactilely distinguishable formation. In this variation, the step of retrieving a user preference S130 may also include retrieving a user preference between a first sensitivity and a second sensitivity for the sensor through the user interface and the step of manipulating the volume of fluid to deform a particular region of the surface Step S140 may include manipulating the volume of fluid to deform a particular region of the surface into one of a first embodiment of tactilely distinguishable formation for the first sensitivity for the sensor and a second embodiment of tactilely distinguishable formation for the second sensitivity of the sensor based on the user preference. The step of providing a user interface to retrieve a user input S110 may include providing a user interface to retrieve a user input on the device, providing a user interface to retrieve a user input on the tactile interface layer, providing a user interface to retrieve a user input that is on both the device 10 and the tactile interface layer, providing a user interface on a remote control for the device 10 (for example, a wireless remote control), or providing a user interface in any other suitable arrangement.

1. Providing a Tactile Interface Layer

Figure 3:
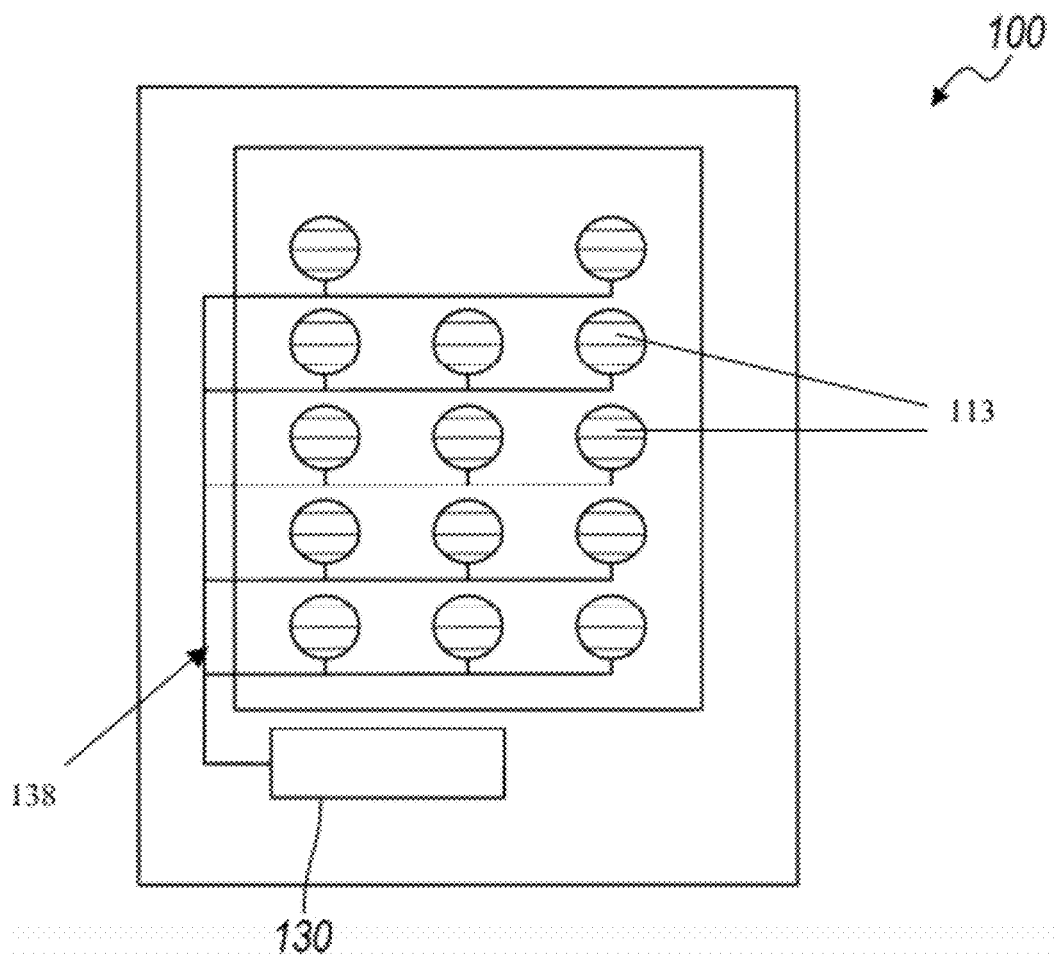
FIG. 3 is a top view of the user interface system of a preferred embodiment.
Figure 4A:
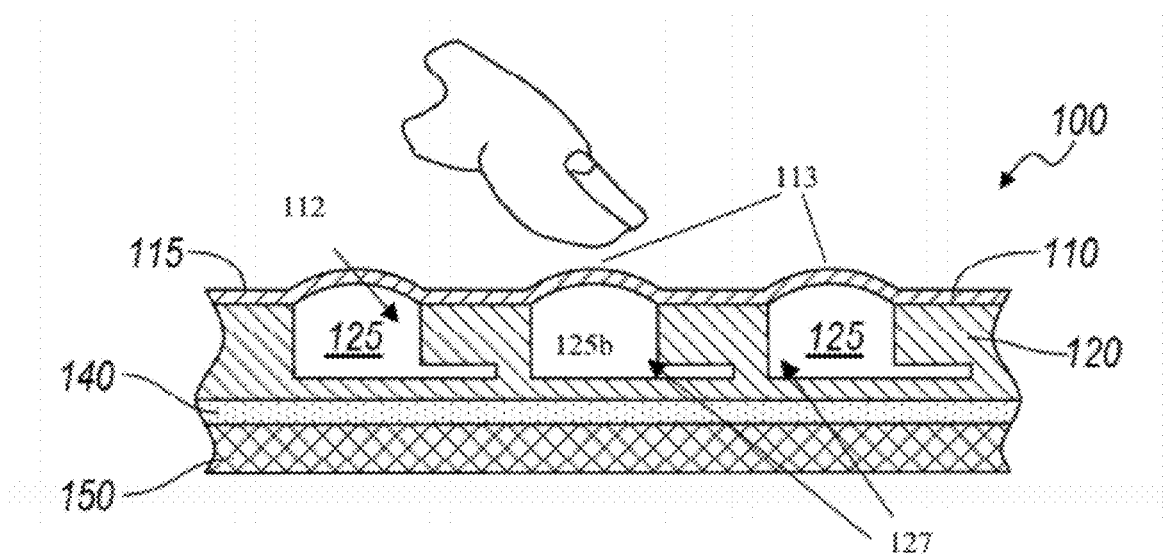
FIGS. 4*a* and 4*b* are cross-sectional views of the tactile interface layer of a first and second variation, respectively.
Figure 4B:
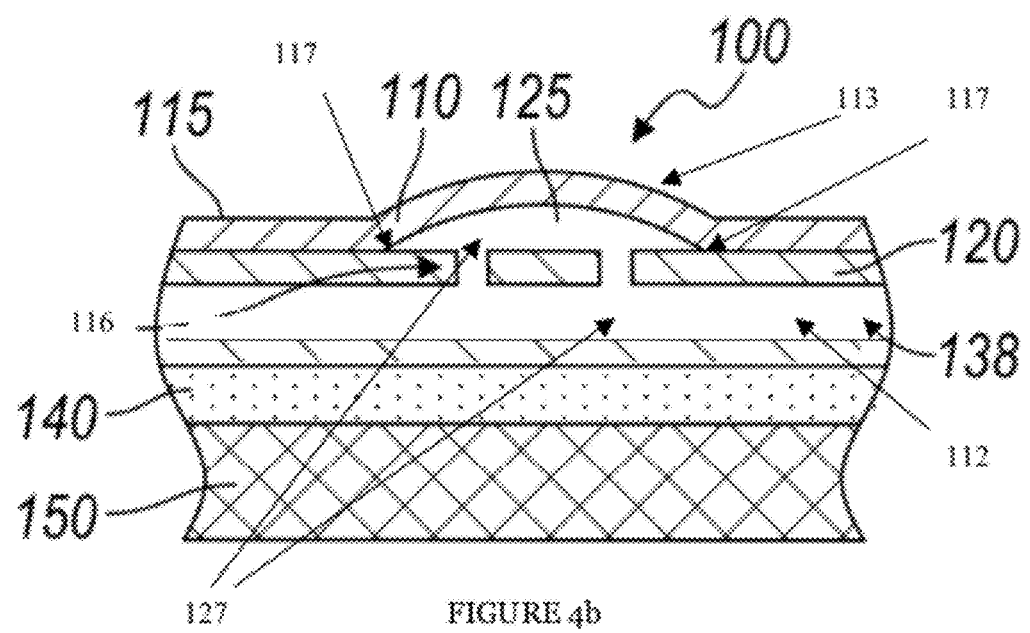

As shown in FIGS. 3 and 4, the tactile interface layer 100 provided in Step S120 of the preferred embodiment includes: a layer 110 defining a surface 115, a substrate 120 supporting the layer 110 and at least partially defining a fluid vessel 127, and a displacement device 130 coupled to the fluid vessel 127 that influences the volume of fluid 112 within the fluid vessel 127 to expand and retract at least a portion of the fluid vessel 127, thereby deforming a particular region 113 of the surface 115. The surface 115 is preferably continuous, such that when swiping a finger across the surface 115 a user would not feel any substantial seams or any other type of interruption in the surface 115. Alternatively, the surface 115 may include features that facilitate the user in distinguishing one region from another. The surface 115 is also preferably planar. The surface 115 is preferably arranged in a flat plane, but may alternatively be arranged in a curved plane or on a first plane and then wrapped around to a second plane substantially perpendicular to the first plane, or any other suitable arrangement. The surface 115 may alternatively include lumps, bumps, depressions, textures, or may be a surface of any other suitable type or geometry. The fluid vessel 127 preferably includes a cavity 125 and the displacement device 130 preferably influences the volume of fluid 112 within the cavity 125 to expand and retract the cavity 125. The fluid vessel 127 may alternatively be a channel 138 or a combination of a channel 138 and a cavity 125, as shown in FIG. 4b. As shown in the variation shown in FIG. 4b, the substrate 120 preferably defines a fluid outlet 116 that allows fluid to flow between the channel 138 and the cavity 125 to deform and un-deform a particular region of the surface 113. The fluid outlet may be formed into the substrate, for example, the fluid outlet 116 may be a series of bores that are machined into the substrate in between the channel 138 and the cavity 125 as shown in FIG. 4b or an open orifice between the cavity 125 and the channel 138 as shown in FIG. 4a, but may alternatively be a property of the material, for example, the substrate 120 may include a porous material that includes a series of interconnected cavities that allow fluid to flow through the substrate 120. The substrate 120 may define any suitable number of fluid outlets 116 that are of any suitable size and shape. The tactile interface layer may also include a fluid outlet layer (not shown) that defines the fluid outlets 116 that is separate from substrate 120 and arranged in between the substrate 120 and layer 110. However, any other suitable arrangement of the fluid outlets 116 may be used. As shown in FIG. 4b, the portion of the substrate 120 (or the fluid outlet layer) that includes the fluid outlets 116 may also function to provide a support for the layer 110 to substantially prevent the layer no from substantially depressing into the channel 138 when force is applied over the particular region 113. However, the substrate 120 may be arranged in any other suitable manner and may provide support for the layer 110 in any other suitable way.

The layer no is preferably attached to the substrate 120 (or fluid outlet layer) at an attachment point 117 that at least partially defines the size and/or shape of the particular region 113. In other words, the attachment point 117 functions to define a border between a deformable particular region of the surface 113 and the rest of the surface 115 and the size of the particular region 113 is substantially independent of the size of the cavity 124 and/or the channel 138. The attachment point 117 may be a series of continuous points that define an edge, but may alternatively be a series of non-continuous points. The attachment point 117 may be formed using, for example, adhesive, chemical bonding, surface activation, welding, or any other suitable attachment material and/or method. The method and material used to form the attachment point 117 is preferably of a similar optical property as the layer 110 and the substrate 120, but may alternatively be of any other optical property. Other portions of the layer 110 and substrate 120 not corresponding to a particular region of the surface 113 may also be adhered using similar or identical materials and methods to the attachment point 117. Alternatively, the layer no and substrate 120 may be left unattached in other portions not corresponding to a particular region of the surface 113. However, the layer 110 and the substrate 120 may be arranged in any other suitable manner.

The fluid vessel 127 may also include a second cavity 125b. When the second cavity 125b is expanded, a second particular region 113 on the surface 115 is preferably deformed. The displacement device 130 preferably influences the volume of fluid 112 within the second cavity 125b independently of the cavity 125, but may alternatively influence the volumes of fluid 112 within both cavity and second cavity 125 and 125b substantially concurrently. Alternatively, the user interface enhancement system 100 may include a second displacement device 130 that functions to influence the volume of fluid 112 within the second cavity 125b to expand and retract the second cavity 125b, thereby deforming a second particular region 113 of the surface. The second cavity 125b is preferably similar or identical to the cavity 125, but may alternatively be any other suitable kind of cavity. The following examples may be described as expanding a fluid vessel 127 that includes a cavity 125 and a channel 138, but the fluid vessel 127 may be any other suitable combination of combination of cavity 125 and/or channel 138. The tactile interface layer 100 may also include a display 150 coupled to the substrate 120 and adapted to output images to the user. As described above, the tactile interface layer 100 may also include a sensor 140 that functions to detect inputs from the user. The sensor 140 may be a capacitive sensor, a pressure sensor, a touch sensitive display, or any other suitable sensor type that detects the presence of a user input. The sensor 140 may be located within the fluid vessel 127, substantially adjacent to the fluid vessel 127 (as shown in FIGS. 4a and 4b), remote from the fluid vessel 127, remote from a cavity 125 but fluidly coupled to the fluid vessel 127, or in any other suitable location.

The tactile interface layer 100 of the preferred embodiments has been specifically designed to be used as the user interface for an electronic device 10, more preferably in an electronic device 10 that benefits from an adaptive user interface. The electronic device 10 may or may not include a display and/or a touch sensor, for example, an automotive console, a desktop computer, a laptop computer, a tablet computer, a television, a radio, a desk phone, a mobile phone, a PDA, a personal navigation device, a personal media player, a camera, a watch, a remote control, a mouse, a trackpad, or a keyboard. The tactile interface layer 100 may, however, be used as the user interface for any suitable device 10 that interfaces with a user in a tactile and/or visual manner. The tactile interface layer 100 is preferably integrated with the device, for example, in the variation wherein the tactile interface layer 100 includes a sensor 140, the tactile interface layer 100 is preferably assembled into the device 10 and presented to the user as one unit. Alternatively, the tactile interface layer 100 may function as an accessory to a device 10, the user may be presented the tactile interface layer 100 and the device 10 as two separate units wherein, when coupled to each other, the tactile interface layer 100 functions to provide tactile guidance to the user and/or to receive user inputs. However, any other suitable arrangement of the tactile interface layer 100 may be used.

As shown in FIG. 5, the surface 115 of the tactile interface layer 100 preferably remains flat until tactile guidance is to be provided to the user at the location of the particular region 113. The displacement device 130 then preferably expands the cavity 125 to expand the particular region 113 outward, forming a deformation that may be felt by a user, and providing tactile guidance for the user. The expanded particular region 113 preferably also provides tactile feedback to the user when he or she applies force onto the particular region 113 to provide input. Alternatively, the displacement device 130 may retract the cavity 125 to deform the particular region 113 inward. However, any other suitable deformation of the particular region 113 may be used.

As shown in FIG. 5, the cavity 125 of the fluid vessel 127 of the preferred embodiment functions to hold a volume of fluid 112 and to have at least two volumetric settings: a retracted volume setting (shown in FIG. 5a) and an extended volume setting (shown in FIG. 5b). The fluid 112 is preferably a substantially incompressible fluid, but may alternatively be a compressible fluid. The fluid 112 is preferably a liquid (such as water, oil, glycerin, or ethylene glycol), but may alternatively be a gas (such as air, nitrogen, or argon) or any other substance (such as a gel or aerogel) that expands the cavity 125 and deforms the surface 115. In the extended volume setting, the cavity 125 deforms the particular region 113 of the surface 115 above the plane of the other regions of the surface 115. When used with a mobile phone device, the deformation of the particular region 113 preferably has a diameter of 2-10 mm and the cavity 125 may be of a substantially equal diameter as the deformation of the particular region 113 or may be of a smaller or larger diameter. When used with this or other applications, however, the cavity 125 may have any suitable dimension.

The displacement device 130 of the preferred embodiment functions to influence the volume of the fluid 112 with the fluid vessel 127 to expand and retract at least a portion of the fluid vessel 127, thereby deforming a particular region 113 (and/or a second particular region 113) of the surface 115. When used with a mobile phone device, the displacement device 130 preferably increases the volume of the fluid 112 within the fluid vessel 127 by approximately 0.003-0.1 ml to expand the cavity 125 to outwardly deform a particular region 113. When used with this or other applications, however, the volume of the fluid may be increased (or possibly decreased) by any suitable amount. The displacement device 130 preferably modifies the volume of the fluid 112 by (1) modifying the volume of the existing fluid 112 in the fluid vessel 127, or (2) adding and removing fluid 112 to and from the fluid vessel 127. The displacement device 130 may, however, influence the volume of the fluid 112 by any suitable device or method. Modifying the volume of the existing fluid 112 in the fluid vessel 127 most likely has an advantage of lesser complexity, while adding and removing fluid 112 to and from the fluid vessel 127 most likely has an advantage of maintaining the deformation of the surface 115 without the need for additional energy (if valves or other lockable mechanisms are used). Although the cause of the deformation of a particular region 113 of the surface 115 has been described as a modification of the volume of the fluid in the fluid vessel 127, it is possible to describe the cause of the deformation as an increase or decrease in the pressure below the surface 115 relative to the pressure above the surface 115. When used with a mobile phone device, an increase of approximately 0.1-10.0 psi between the pressure below the layer no relative to the pressure above the layer 110, is preferably enough to outwardly deform a particular region 113 of the surface 115. When used with this or other applications, however, the modification of the pressure may be increased (or possibly decreased) by any suitable amount.

The shape of the deformation of the particular region 113 is preferably one that is felt by a user through their finger and preferably acts as (1) a button that can be pressed by the user, (2) a slider that can be pressed by the user in one location along the slider or that can be swept in a sliding motion along the slider (such as the "click wheel" of the second generation Apple iPod), and/or (3) a pointing stick that can be pressed by the user from multiple directions and/or locations along the surface whereby the user is provided with tactile feedback that distinguishes a first directional touch from a second directional touch and/or a touch in a first location from a touch in a second location (such as the pointing stick trademarked by IBM as the TRACKPOINT and by Synaptics as the TOUCHSTYK (which are both informally known as the "nipple")). The deformation may, however, act as any other suitable device or method that provides suitable tactile guidance and feedback. In the variation including a display 150, the shape of the deformation of the particular region 113 also preferably functions to minimize the optical distortion of the image underneath the deformed particular region 113.

2. Retrieving a User Preference and Manipulating the Volume of Fluid

The user preference retrieved in Step S130 is preferably one of the following embodiments: a first embodiment for the operation of the tactile interface layer 100, a second embodiment for interaction between the device and the tactile interface layer, and a third embodiment for operation of the device. The step of retrieving a user preference S130 of the first embodiment preferably includes retrieving a user preference for the operation of the tactile interface layer Step S132 and the step of manipulating the volume of fluid to deform a particular region of the surface of the first embodiment S140 preferably includes manipulating the volume of fluid to deform a particular region of the surface based on the user preference for the operation of the tactile layer Step S142. The step of retrieving a user preference S130 of the second embodiment preferably includes retrieving a user preference for the interaction between the device 10 and the tactile interface layer Step S134 and the step of manipulating the volume of fluid to deform a particular region of the surface S140 of the second embodiment preferably includes manipulating the volume of fluid to deform a particular region on the surface based on the user preference for the interaction between the device 10 and the tactile interface layer Step S144. The step of retrieving a user preference S130 of the third embodiment preferably includes retrieving a user preference for the operation of the device Step S133. A user preference for the operation of the device may be a user preference for vibrating and/or producing a sound when a particular region 113 is deformed or when a particular application of the device is actuated. Alternatively, a user preference for the operation of the device may include a user preference for the loudness of the sound produced and/or the magnitude of the vibration produced. However, the user preference for the operation of the device may be any other suitable kind of preference for an application of the device.

2.1 User Preference of a First Embodiment

A user preference of the first embodiment may be one of several variations: (1) a preference for the geometry of the deformation (e.g., the size of the deformed particular region 113), (2) a preference for the tactile feel of the deformation (e.g., the firmness of the deformation), (3) a preference for the performance of the deformation (e.g., the deformation rate of the particular region 113 and/or the time that the particular region 113 is deformed), (4) a preference for the sensitivity of the sensor 140 (for example, sensitivity at the deformed particular region 113, sensitivity at the un-deformed particular region 113, or sensitivity for any other suitable state or location along the surface 115) or (5) a preference for the location of the particular region 113 relative to the tactile interface layer 100. In the variation of the fluid vessel 127 that includes a second cavity 125b that corresponds to a second particular region 113, a sixth variation may include a preference for which of the particular region 113 and/or second particular region 113 to deform. In the variation of the tactile interface layer that includes a display 150, a seventh variation may include a preference for a tactilely distinguishable formation independent of the operation of the display 150. However, any other suitable user preference for the operation of the tactile interface layer may be retrieved through the user interface in Step S132.

The volume of fluid may be manipulated in one of several variations to deform a particular region of the surface based on the user preference for the operation of the tactile layer S142.

A first variation of manipulating the volume of fluid to deform a particular region of the surface based on the user preference for the operation of the tactile interface layer S142 preferably includes adjusting the operation of the displacement device 130 and is preferably applied to the first, second, and/or third variation of a user preference of the first embodiment. In particular, adjusting the operation of the displacement device 130 is preferably used to adjust the geometry, tactile feel, and performance of the deformation of the particular region 113. As mentioned above, the cause of the deformation of the particular region 113 may be thought of as an increase in the pressure below the surface 115 relative to the pressure above the surface 115. The displacement device 130 functions to provide this increase in pressure by modifying the volume of fluid 112 within the cavity 125. For example, the level of increase in the volume of fluid 112 within the cavity 125 directly influences the level of increase of the pressure below the surface 115, and by changing the level of increase in pressure below the surface 115 relative to the pressure above the surface 115, characteristics such as the firmness and the height of the deformation of the particular region 113 may be adjusted. The rate of increase of the pressure below the surface 115 relative to the pressure above the surface 115 may also affect the rate at which the deformation of the particular region 113 occurs. Similarly, the length of time that the displacement device 130 provides the increased pressure is directly related to the length of time that a particular region is deformed. By providing adjustments through varying the operation parameters of the displacement device 130 in this first variation, the number of available adjustment settings is directly related to the number of available variations in the operation parameters of the displacement device 130. For example, in adjusting the firmness of the deformation of the particular region 113, the tactile interface layer 100 may provide a minimum firmness and a maximum firmness with a substantially large number of firmness level settings in between the minimum and maximum firmness, each correlating with a volume increase within the cavity 125 that a displacement device 130 of the first variation may induce or a volume of fluid 112 that a displacement device 130 may provide. This may provide the user with the ability to apply an adjustment setting that is substantially close to their personal preference. The number of available settings may be less than the number of available variations in the operation parameters of the displacement device 130 to decrease complexity. However, any other suitable number of adjustment settings may be provided to the user.

Figure 6A:
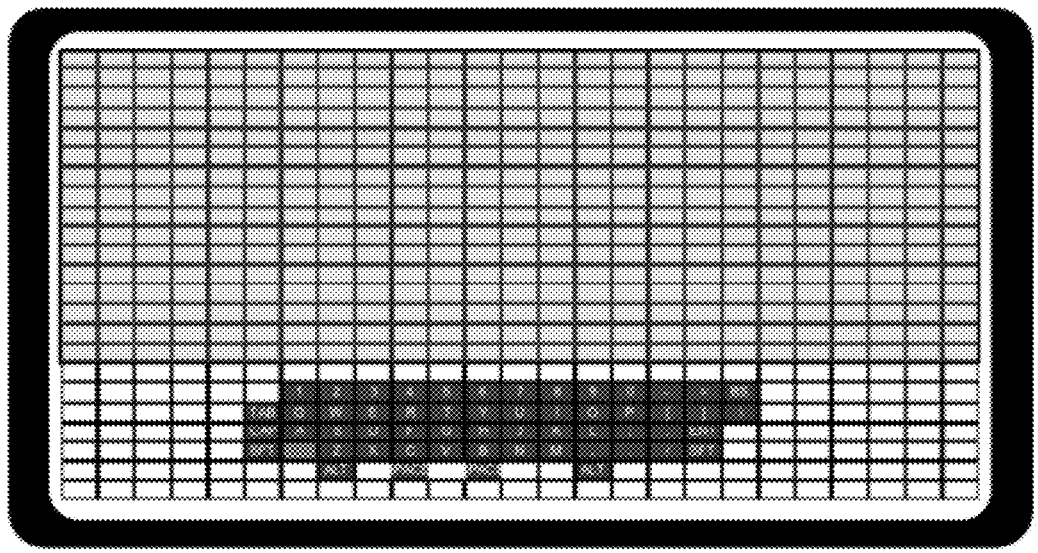
FIGS. 6*a* and 6*b* is a representation of a set of variations to the user interface system.
Figure 6B:
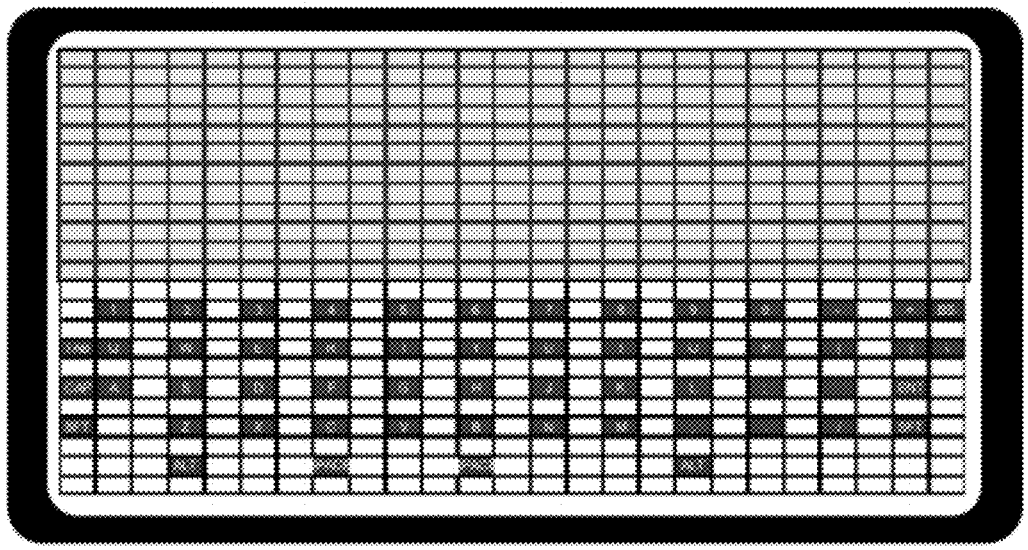

In another example of the first variation, adjusting the operation of the displacement device 130 may be applied to the fifth variation of the user preference of the first embodiment where the user provides a preference for the location of the particular region 113 relative to the tactile interface layer 100 and/or the sixth variation where there is a second cavity 125b and the user provides a preference for which of the particular region 113 and/or second particular region 113 to deform. In particular, the displacement device 130 may function to selectively expand the cavity 125 and/or the second cavity 125b corresponding to a particular region 113 that is indicated in the user preference. The user may select one particular region from a first and a second particular region that they desire to be expanded to provide tactile guidance in a certain user scenario. Alternatively, there may be a plurality of cavities 125 and second cavities 125b that are arranged into a first group and a second group. In an example of a user selection for a particular usage scenario, the first group may include a first spacing in between each particular region 113 of the first group and the second group may include a second spacing in between each particular region 113 of the second group, as shown in FIGS. 6a and 6b. A user may prefer the second spacing (for example, a larger spacing) and select to expand the second group during use. The displacement device 130 then functions to expand the second group for the particular usage scenario. Any other variations to the operation parameters of the displacement device 130 may be used to adjust the characteristics of the first embodiment of the tactile interface layer 100.

A second variation of manipulating the volume of fluid to deform a particular region of the surface based on the user preference for the operation of the tactile interface layer S142 preferably includes adjusting the deformation of the particular region 113 to set a user preference of the fourth variation for the sensitivity of the sensor 140. For example, the sensor 140 may be a capacitive sensor that detects the presence of the finger of the user at a distance away from the surface 115. To decrease the sensitivity of the sensor 140, the height of the deformation of the particular region 113 may be increased such that, when the finger of the user is resting on the top of the deformed particular region 113, a user input is not registered. In other words, the equivalent sensitivity of the sensor may be decreased while the actual sensitivity of the sensor remains the same. Alternatively, the sensitivity of the sensor 140 may be adjusted by adjusting the operation of the sensor 140. In one example, the thresholds for the sensor 140 to register a user input may be adjusted. In the variation wherein the sensor 140 is a touch sensitive display, a touch at any location along the display may register as a user input regardless of the presence of a particular region 113, preventing the user from resting their finger on a deformed particular region 113 as a user would normally be able to do on a static tactile interface such as those found on a remote control with mechanical buttons or a Blackberry mobile phone. In this variation, the user may input a user preference for a lower sensitivity for the sensor 140 wherein a user input is registered only if the finger is at a certain distance away from the touch sensitive display, preferably one wherein the distance is less than the distance between the most distant point of the deformation of the particular region 113 from the surface 115, allowing the user to rest their finger on the deformation and the sensor 140 only registering a user input when the deformation is inwardly deformed by force applied by the user. In the variation wherein the sensor 140 is a capacitive or a pressure sensor, the sensitivity of the sensor 140 may be adjusted such that a user input is registered with a certain degree of change in capacitive or pressure reading. However, any other suitable adjustment to the sensitivity of the sensor 140 may be provided to the user.

In another example of adjusting the operation of the sensor 140, readings from the sensor 140 may be ignored and/or the sensor 140 may be disabled. In the variation wherein the sensor 140 is a touch sensitive display, certain portions of the touch sensitive display may be disabled and/or readings from certain portions of the touch sensitive display may be ignored. For example, for certain usage scenarios, the particular region 113 that is deformed may be on a first portion of the touch sensitive display. The user may input a user preference to disable the remaining portions of the touch sensitive display to prevent undesired touch inputs, but may alternatively allow the remaining portions of the touch sensitive display to continue to receive touch inputs, allowing the user to select options that are displayed in a location wherein the particular region 113 is not deformed. However, any other suitable combination of ignored readings, disabled sensing, and/or enabled sensing may be used.

A third variation of manipulating the volume of fluid to deform a particular region of the surface based on the user preference for the operation of the tactile interface layer S142 preferably includes manipulating the volume of fluid to deform a particular region of the surface independently of the state of the display 140 and is preferably applied to the seventh variation of a user preference of the first embodiment to set a user preference for a tactilely distinguishable formation independent of the operation of the display 150. For example, the user preference may include disabling the display 150 while enabling the sensor 140. Subsequently, the volume of fluid is manipulated to expand a particular region of the surface. Because the tactile interface layer 100 provides tactile guidance, the visual guidance provided by the display 150 is not necessary in certain scenarios to guide the user in the user of the device 10. Disabling the display 150 allows the device 10 to conserve energy, potentially extending the use time per charge of the device 10 if the device 10 is a portable device such as a camera or a cellular phone.

The user preferences for the operation of the tactile interface layer 100 retrieved in Step S132 are preferably one of the variations as described above but may alternatively be any other suitable combination of or any other kind of user preference for the operation of the tactile interface layer 100. The volume of fluid is preferably manipulated in Step S142 using a system or method described above, but may alternatively be a combination of the systems and/or methods described above or any other suitable system or method.

2.2 User Preference of a Second Embodiment

A user preference for the interaction between the device and the tactile interface layer retrieved in Step S132 may also be of one of several variations. In a first variation, the user preference of the second embodiment may be a preference for the location of the particular region 113 relative to the device 10. For example, the user may indicate the location of the particular region 113 relative to the device 10 that best fits the size of his or her hand. In a second variation, the tactile interface layer 100 may include a second cavity 125b that corresponds to a second particular region 113, and the user preference of the second embodiment may be a preference for the location of a particular region 113 relative to another particular region 113. For example, the displacement device 130 may manipulate fluid to deform a plurality of particular regions 113 into tactilely distinguishable formations that cooperatively represent a keyboard layout and the user preference may be a preference for the relative location between the keys of the keyboard, as shown in FIGS. 6a and 6b. By allowing the user to provide a preference for the relative location between the keys of the keyboard the tactile interface layer 100 is substantially customized to each individual user, which may increase the usability of the keyboard and may potentially decrease the risk of repetitive stress syndrome.

A third variation of a user preference of the second embodiment may include a preference for the timing for the actuation of a deformation. As an example, the user preference may include the preference for actuation of a deformation when a particular application of the device is actuated. The tactile interface layer 100 may define a plurality of particular regions 113 that cooperatively represent a numeric keypad and device 10 may include a phone application and the user preference may be to actuate the deformation of the plurality of particular regions 113 when the phone application is actuated. In another example, the displacement device 130 may manipulate fluid to deform a plurality of particular regions 113 into tactilely distinguishable formations that cooperatively represent a QWERTY keyboard and the device 10 may include a typing application and the user preference may be to actuate the expansion of the QWERTY keyboard when the user initiates a typing application. In yet another example, the displacement device 130 may manipulate fluid to deform a plurality of particular regions 113 into tactilely distinguishable formations and the user preference may include a preference for the actuation of the deformation of a particular tactilely distinguishable formation at a particular timing. The plurality tactilely distinguishable formations cooperatively represent a keyboard and the user preference preferably includes a preference for a tactilely distinguishable region representing a particular key.

The user preference for interaction between the device 10 and the tactile interface layer 100 retrieved in Step S134 is preferably one of the variations as described above but may alternatively be any other suitable combination of or any other kind of user preference for the operation of the device 10 and/or interaction between the device 10 and the tactile interface layer 100.

The volume of fluid is preferably manipulated in Step S144 using a system or method described above for the step of manipulating the volume of fluid to deform a particular region of the surface Step S142, but may alternatively be a combination of the systems and/or methods described above or any other suitable system or method. The manipulation of the fluid is preferably actuated by a processing unit of the device 10, for example, actuating the expansion of the desired cavity 125 during certain usage scenarios such as incoming phone calls on a phone. However, any other suitable interaction between the device 10 and the tactile interface layer 100 may be used.

3. Providing a User Interface

As described above, the user interface provided in Step S110 to retrieve a user input may be provided on the tactile interface layer 100, which may allow the user to have a direct tactile comparison between different available settings for the tactile interface layer 100; on both the device 10 and the tactile interface layer 100, which may allow the device 10 and the tactile interface layer 100 to cooperatively provide a user interface for the user; on the device 10; or in any other suitable arrangement. The device 10 and/or the tactile interface layer 100 preferably enters a "customization mode" wherein the user is prompted to provide inputs for user preferences that preferably do not register as any other kind of input. The user interface tactile, visual, audible, or in any other suitable kind of media.

In a first variation of the user interface, the interface is provided on the tactile interface layer 100. In a first example of the user interface of the first variation, the user interface may provide a plurality of expanded cavities 125 and/or 125b that result in a plurality of deformed particular regions 113 on the tactile interface layer 100, wherein each of the plurality of deformed particular regions 113 is of a different characteristic such as a different degree of firmness and/or a different shape. The user then selects the particular region 113 that best fits their preferences and the selection is detected by the sensor 140 and sent to a processing unit in the tactile interface layer 100 and/or a processing unit in the device 10.

In a second example of the first variation, the user interface may provide a deformed particular region 113 in the form of a slider on the tactile interface layer 100. The slider may include a plurality of regions, each region representing a different degree of a characteristic such as firmness, size, and/or distance between deformations. The user may slide their finger along the slider to experience the various degrees of the characteristic and select the desired degree. The selection may be inputted by providing force at the location along the slider of the degree they select, but may alternatively be a selection inputted adjacent to the slider or any other suitable location or kind of input.

In a third example of the first variation, the user interface may provide a deformed particular region 113 in the form of a slider and another particular region 113 in the form of an "example region" on the tactile interface layer 100. The user may adjust the position of the slider to adjust the option for adjustment demonstrated by the "example region." The user may tactilely feel the example region as they adjust the slider and then select their desired adjustment. The slider is preferably of a uniform characteristic to decrease the tactile variations felt by the user and to potentially decrease confusion, but may alternatively emulate the adjustment demonstrated by the example region to allow the user to tactilely feel the adjusted characteristic on more than one location or shape of deformed particular region.

In a fourth example of the first variation, the user interface may provide a deformed particular region 113 that transitions in between different degrees of a characteristic such as firmness, or size and the user selects the desired degree. The transitions are preferably cyclic and repeat the range of degrees for the user to experience as many times as necessary before making a selection. The user may input the selection as the deformed particular region 113 is demonstrating the various available options, but may alternatively input the selection after the deformed particular region 113 has demonstrated the available options. The rate of demonstration by the deformed particular region 113 is preferably at a slow rate to allow the user to adequately examine the option for their decision, but may alternatively be an adjustable rate or any other suitable rate.

In a fifth example of the first variation, the user interface may provide a plurality of cavities 125 that may correspond to, for example, a keyboard layout. A plurality of cavities 125 is expanded and a plurality of deformed particular regions of the surface 113 is presented to the user. The user may then select the set of deformed particular regions of the surface 113 that best fit their hand shape for a particular application as described in the second variation of a user preference of the second embodiment retrieved in Step S134 and as shown in FIGS. 4a and 4b. In the example of a keyboard layout, the user may select the set of deformed particular regions that best match their hand size and shape, allowing for a more personalized keyboard layout for each individual user, potentially decreasing the risk of repetitive stress disorder that may result from arranging the hand of the user in an uncomfortable and stressful position. In the example of the keyboard layout, the user may be presented with a plurality of options for the location of the deformed particular region that corresponds to each keyboard key. The options for the location of each key may be presented concurrently with the options for every other key in the keyboard, but may alternatively be presented to the user one after the other. However, any other suitable method to allow the user to select their desired location of each key may be used. Once the location of each key is determined, the user may then be prompted to select the desired height and/or firmness of each key, allowing the user interface system to accommodate to the natural angle of the user's hands, further decreasing the potential of repetitive stress syndrome.

Figure 7:
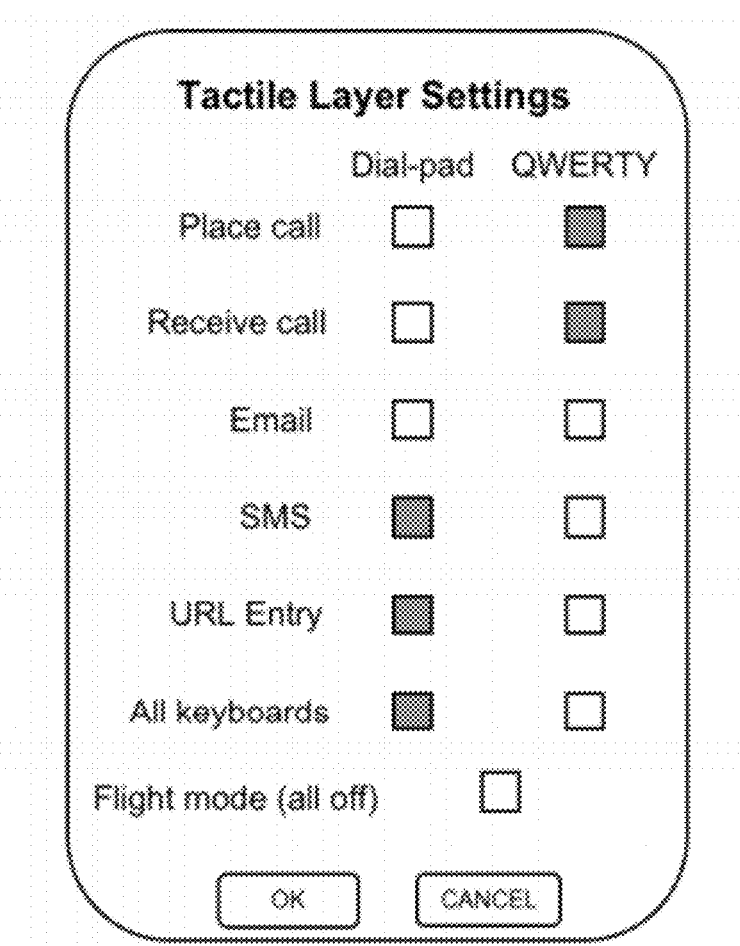
FIGS. 7-9 are examples of input interfaces provided to the user on the device.

In a second variation of the user interface, the user interface is provided on the device 10. This variation is particularly applicable in retrieving a user preference for the interaction of the device and the tactile interface layer S134. The user interface as provide on the device 10 is preferably applied to a device 10 that includes a display 150 that provides an image to communicate to the user, but may alternatively be applied to any other suitable kind of device, for example, a device that includes a speaker to communicate with the user, or a device that provides a vibration to communicate with the user. In a first example of the second variation of the user interface, as shown in FIG. 7, the user interface may provide a series of check boxes where the user may choose options for the actuation of the deformation of the particular region 113 (such as to retrieve a user preference for the actuation of a deformation in the third variation of the user preference of the second embodiment). As shown in FIG. 7, the user may select to actuate the deformation of the particular region 113 when the "place call," "receive call," "email," etc, application of the device 10 is actuated. Additionally, the user may provide a preference for the arrangement of the particular region 113 that is to be deformed, for example, a QWERTY keyboard or a numeric keypad.

Figure 8:
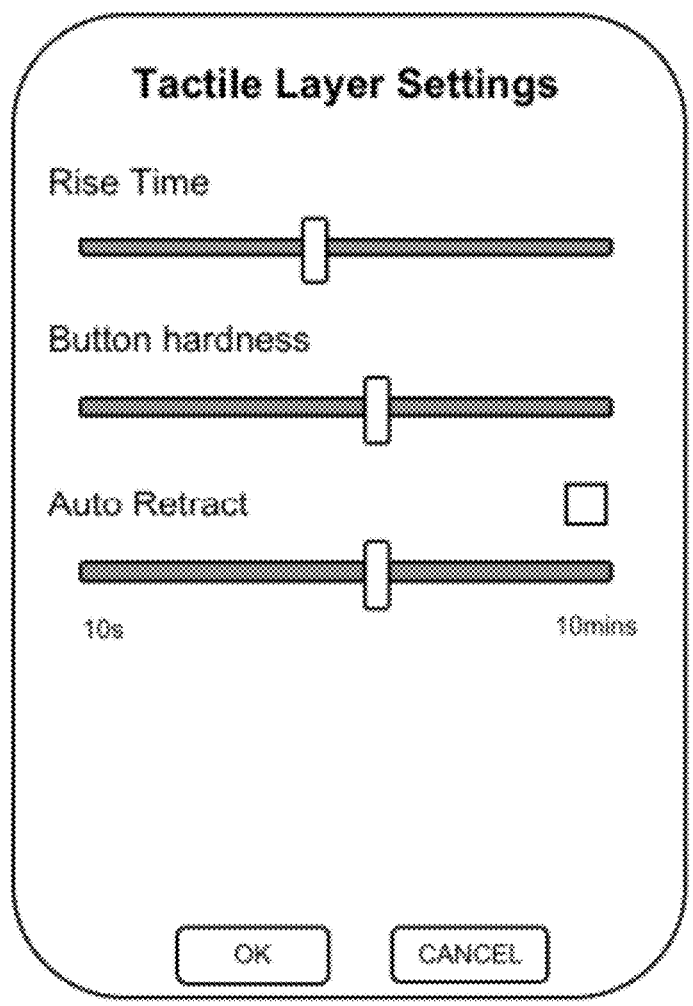

In a second example of the second variation, as shown in FIG. 8, the user interface may provide an interface on the device 10 that allows the user to provide a preference for the operation of the tactile interface layer 100. In other words, a user interface to retrieve a user preference for the operation of the tactile layer 100 (the first embodiment of user preference) may be provided on the device 10. This example of the second variation of the user interface may function similarly to the second and third example of the user interface of the first variation that provide a slider on the tactile interface layer 100.

Figure 9:
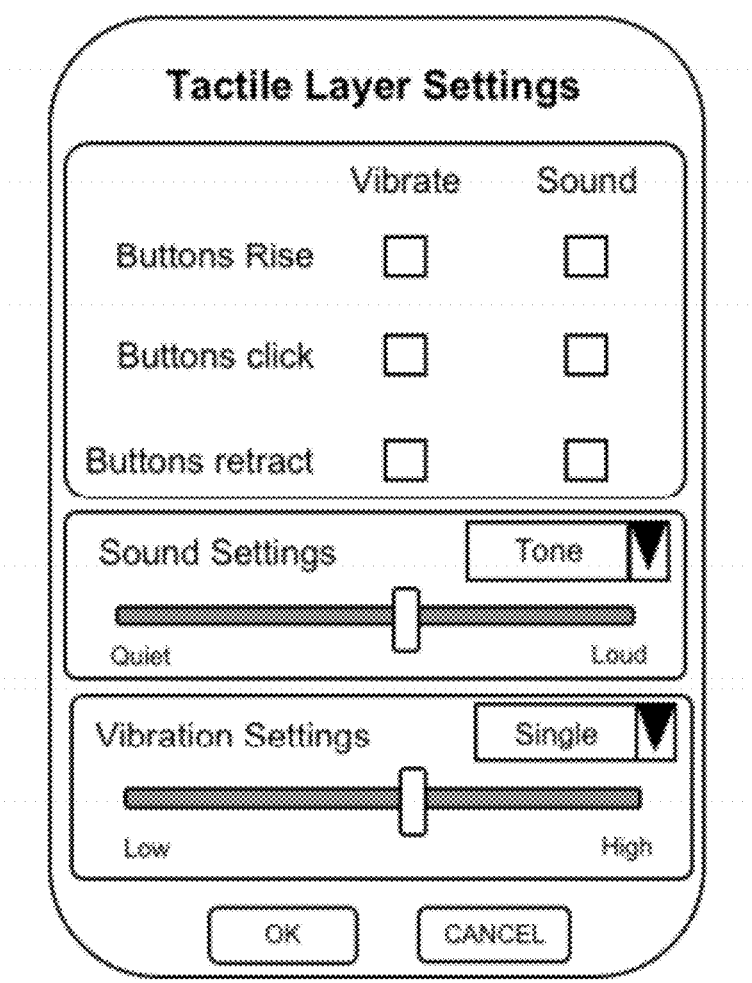

In a third example of the second variation, as shown in FIG. 9, the user interface may provide an interface on the device 10 that allows the user to provide a preference for the operation of the device, for example, vibrating and/or producing a sound when a particular region 113 is deformed or when a particular application of the device is actuated. This is particularly applicable to retrieving a user preference for the operation of the device in Step S133.

In a fourth example of the second variation, the user interface may allow the user to select the desired location for a particular region. For example, in the variation where the device 10 includes an application which uses a keyboard, the user interface may prompt the user to select the desired location for each key in a keyboard instead of providing options to the user for the location of each key in the keyboard. The user may alternatively be asked to place the fingers of their hand in the most natural position onto the tactile interface layer 100. The location of each finger is detected and the cavity 125 and particular region of the surface 113 that is substantially adjacent to the location of the finger is then selected as the location of the keyboard key.

In a third variation of the user interface, the user interface may be is provided on a device that is external to both the device 10 and the tactile interface layer 100. For example, the user interface may be provided an application on the Internet, on a personal computer, or any other suitable medium.

The user interface of the preferred embodiments is preferably one of the variations described above, but may alternatively be a combination of the variations described above. For example, the user interface may provide a slider on the device 10 that functions to control the characteristic of an "example region" on the tactile interface layer 100, allowing the device 10 and the tactile interface layer 100 to cooperatively provide a user interface to the user. The device may also provide a visual indicator (for example, a numerical level setting) that indicates the level of a particular setting. This may facilitate in communicating setting options to the user. However, any other suitable user interface may be used.

As shown in FIGS. 1 and 2, a processing unit retrieves a user preference that is provided by the user on the user interface S130 and sets the user preferences to the operating conditions S140. The processing unit may actuate the manipulation of the volume of fluid based on the user preferences to the operation of the tactile interface layer S132, the operation of the device S133, and/or the interaction between the device and the tactile interface layer S134. In a first variation, the processing unit may be included into the tactile interface layer 100 and may also function to control the displacement device 130, sensor 140 and/or the display 150. The processing unit may communicate directly with the components of the tactile interface layer 100 (e.g. the displacement device 130), but may alternatively communicate with the components of the tactile interface layer 100 in any other suitable manner. The processing unit of this first variation may function to communicate with a processing unit of the device 10 to receive signals representing user selections.

In a second variation, the processing unit may be included into the device 10 and may also function to control the applications of the device 10. The processing unit of this second variation may communicate directly with the components of the tactile interface layer 100 (e.g. the displacement device 130), but may alternatively communicate to the components of the tactile interface layer 100 in any other suitable manner. The processing unit of this second variation may communicate with the components of the tactile interface layer 100 through a wired communication protocol, a wireless communication protocol, or any other suitable kind of communication protocol.

In a third variation, the processing unit may be external to both the tactile interface layer 100 and the device 10, for example, a personal computer that is communicably coupled to the tactile interface layer 100 and/or the device 10. In this variation, when the user desires to provide and/or apply user preferences to operating conditions, the device and/or the tactile layer 100 may be connected to a personal computer that may include an interface that allows the user to provide a user preference.

The processing unit of the preferred embodiments is preferably one of the variations as described above, but may alternatively be any combination of the above variations. For example, the tactile interface layer 100 may include a processing unit that functions to control the tactile interface layer 100 and the device 10 may include a processing unit that functions to control the device 10. The processing units of the tactile interface layer 100 and the device 10 may function to communicate with each other to provide control for an operating condition. In this variation, the processing unit of the tactile interface layer 100 may communicate with the processing unit of the device 10 through a wired communication protocol, a wireless communication protocol, or any other suitable kind of communication protocol. However, any other suitable arrangement of the processing unit may be used.

As a person skilled in the art will recognize from the previous detailed description and from the figures and claims, modifications and changes can be made to the preferred embodiments of the invention without departing from the scope of this invention defined in the following claims.

We claim:

1. A method, for adjusting a user interface of a device, comprising:
   providing a user interface comprising:
      a substrate comprising an attachment face and a plurality of support members continuous with the attachment face, each support member including a fluid channel configured to communicate fluid through the support member, the substrate defining a fluid network fluidly coupled to a portion of the fluid channels;
      a tactile layer comprising an outer tactile surface and a back surface opposite the tactile surface, the back surface coupled to the attachment face at an undeformable region of the tactile layer, the back surface adjacent to and disconnected from the support members at a plurality of deformable regions of the tactile layer, each deformable region of a thickness at least as great as a width dimension of a corresponding fluid channel, each support member configured to limit inward deformation of a corresponding deformable region due to a force applied to the tactile surface; and
      a displacement device configured to displace fluid through the fluid network and toward the back surfaces of a portion of the deformable regions to transition each of the portion of deformable regions from a retracted setting to an expanded setting, each deformable region defining a tactile guidance at the tactile surface in at least one of the retracted and expanded settings;
   retrieving a user preference for either of a first characteristic and a second characteristic of the tactile guidance proximal at least one deformable region; and
   displacing fluid through the fluid network to transition the tactile guidance to either of the first characteristic and the second characteristic based upon the user preference.

2. The method of claim 1, further comprising providing a display coupled to the substrate and transmitting an image through the tactile surface, wherein the image is an input key substantially aligned with at least one deformable region of the tactile layer.

3. The method of claim 1, wherein retrieving the user preference includes capturing a user input through the user interface.

4. The method of claim 1, further comprising displacing fluid through the fluid network to transition a portion of the deformable regions to the expanded setting, wherein, in the expanded setting, the deformable regions represent keys of a keyboard.

5. The method of claim 4, wherein the keyboard is of a type selected from the group consisting of an alphabetical keyboard and a numeric keypad.

6. The method of claim 1, wherein displacing fluid through the fluid network includes:
   for the first characteristic, transitioning a first selection of deformable regions from the retracted setting to the expanded setting; and
   for the second characteristic, transitioning a second selection of deformable regions from the retracted setting to the expanded setting.

7. The method of claim 1, wherein displacing fluid through the fluid network includes:
   for the first characteristic, deforming a deformable region to a first height in the expanded setting; and
   for the second characteristic, deforming the deformable region to a second height different than the first height in the expanded setting.

8. The method of claim 7, further comprising adjusting fluid pressure within a portion of the fluid channels to adjust the offset of corresponding deformable regions relative to the undeformable region.

9. The method of claim 1, wherein displacing fluid through the fluid network includes:
   for the first characteristic, adjusting the firmness of a deformable region to a first firmness; and
   for the second characteristic, adjusting the firmness of the deformable region to a second firmness different than the first firmness.

10. The method of claim 9, further comprising adjusting fluid pressure within a portion of the fluid channels to adjust the firmness of the deformable region in the expanded setting.

11. The method of claim 1, wherein displacing fluid through the fluid network includes:
for the first characteristic, transitioning a deformable region, from the retracted setting to the expanded setting, at a first rate; and
for the second characteristic, transitioning a deformable region, from the retracted setting to the expanded setting, at a second rate different than the first rate.

12. The method of claim 1, wherein displacing fluid through the fluid network includes:
for the first characteristic, maintaining a deformable region in the expanded setting for a first duration of time; and
for the second characteristic, maintaining a deformable region in the expanded setting for a second duration of time different than the first duration of time.

13. The method of claim 1, wherein displacing fluid through the fluid network includes:
for the first characteristic, transitioning a deformable region from the retracted setting to the expanded setting, after a first time duration, following a particular event; and
for the second characteristic, transitioning the deformable region from the retracted setting to the expanded setting, after a second time duration, following the particular event.

14. The method of claim 1, further comprising detecting an input on the tactile surface proximal at least one deformable region.

15. The method of claim 14, comprising detecting a fluid pressure change in a portion of the fluid network, wherein the pressure change is indicative of a an input on the tactile surface.

16. The method of claim 14, comprising:
receiving a user selection for either of a first sensitivity and a second sensitivity to a user touch on the tactile surface proximal a deformable region; and
adjusting the sensitivity of the tactile guidance to either of the first and the second sensitivities based upon the user selection.

17. The method of claim 1, wherein the device is an electronic device selected from the group consisting of: an automotive console; a desktop computer; a laptop computer; a tablet computer; a television; a radio; a desk phone; a mobile phone; a PDA; a personal navigation device; a personal media player; a camera; a gaming console; a gaming controller; a remote control; and a watch.

18. The method of claim 1, further comprising:
receiving a user selection for either of a first action and a second action of the device; and
adjusting an action of the device to either of the first action and the second action based upon the user selection.

19. The method of claim 18, wherein the first action is a feedback mechanism at a first intensity and the second action is the feedback mechanism at a second intensity.

20. The method of claim 18, wherein the first and second actions are selected from the group consisting of: vibratory feedback, audible feedback, and visual feedback.

* * * * *